UNITED STATES PATENT OFFICE.

FRANCISCO SOTO MOYANO, OF AGUILAS, SPAIN.

PROCESS TO UTILIZE THE INFERIOR CALAMINS.

No. 863,417.  Specification of Letters Patent.  Patented Aug. 13, 1907.

Application filed October 20, 1906. Serial No. 339,891.

*To all whom it may concern:*

Be it known that I, FRANCISCO SOTO MOYANO, a subject of the King of Spain, residing at Aguilas, in the Province of Murcia and Kingdom of Spain, have invented certain new and useful Improvements in Metallurgical Chemical Processes to Utilize the Inferior Calamins, of which the following is a specification.

This invention relates to the reduction of zinc ores and has particular reference to an improved process of utilizing inferior calamins for extracting zinc therefrom in the form of an oxid.

Calamin is a mixture of carbonate of zinc and silicon which seldom occurs pure in nature, being generally associated with calcium carbonate, magnesium carbonate, oxid of iron, and alumina. The gangue frequently carries smaller amounts of other minerals.

Preparatory to the reduction of calamin ores it is important to separate and eliminate as much of the gangue as possible in order to increase the zinc content of the ore treated. Some mechanical processes for the separation of the gangue from the zinc bearing ore based upon difference in densities have been tried, but the specific gravities of compounds of zinc and the gangue referred to are so near alike that the practical separation of the ore and gangue in this way is found to be impossible. In the process forming the subject matter of the present application I am able to effect the complete separation of the zinc compounds from the gangue by utilizing the chemical reactions hereinafter mentioned.

My improved process for the separation of zinc in the form of an oxid from low grade calamin and other zinc ores is based upon the following facts.

First, if calamin is calcined the zinc carbonate contained therein is decomposed into oxid of zinc and carbon dioxid. The silicate of zinc is decomposed into zinc oxid and silica. The carbonate of lime and magnesia give up their carbon dioxid, lime and magnesia being left. The oxids of iron and alumina undergo no change. After calcination there remains a mixture of oxid of zinc, silica, oxid of iron, lime, magnesia and alumina.

Second, if the oxid of zinc mixed with the gangue is placed in a solution of newly prepared chlorid of calcium and heated to 100° C., the oxid of zinc will be decomposed and chlorid of zinc and lime formed. The chlorid of zinc will be in the form of a solution, while the lime will form as a precipitate in the bottom of the receptacle in which the operation takes place. The nature of the reaction by which the decomposition above mentioned takes place is expressed by the following equation:

$$CaCl_2 + ZnO + H_2O = ZnCl_2 + CaH_2O_2.$$

Third, a solution of chlorid of zinc prepared as above specified and treated with milk of carbonate of magnesia will produce hydrated zinc carbonate and chlorid of magnesium, the former being in the form of a powder, while the latter remains in solution. The reaction is indicated by the following equation:

$$ZnCl_2 + MgO . CO_2 + H_2O = ZnO . CO_2 . H_2O + MgCl_2.$$

Fourth, if carbonate of zinc which has been thus obtained is submitted to the action of a high degree of heat, the carbonate will be decomposed into carbon dioxid, water, and oxid of zinc.

Fifth, if chlorid of magnesium produced as above described is heated to a red heat it will be decomposed into hydrochloric acid, which may be dissolved in water, and magnesium oxid. The hydrochloric acid which is produced may be used in the production of calcic chlorid.

In carrying out my process in its preferred embodiment I proceed as follows: I calcine the ore in a suitable furnace, such, for example, as a reverberatory furnace. The calcined ore is then crushed and subjected to the action of freshly prepared chlorid of calcium, preferably prepared by placing milk of lime in an acid proof receptacle and adding hydrochloric acid until the lime entirely disappears. The crushed ore and chlorid of calcium are heated to 100° C. in any suitable manner, as by contact with steam pipes or the like. Care must be taken to agitate the mixture during this operation and to continue the heating until the oxid of zinc is wholly transformed into chlorid of zinc and dissolved. The chlorid of zinc solution is then drawn off from the lime into a second receptacle where milk of carbonate of magnesia is gradually poured into it and the mixture agitated until no further precipitate of carbonate of zinc is formed. This may be determined by taking some of the liquid from near the top of the receptacle and adding thereto a few drops of sulfid of sodium and then adding a small amount of ammonia. In case the liquid still contains zinc chlorid a sulfid of zinc will be precipitated in the form of a white powder. When all the zinc has been transformed into solid carbonate it is allowed to stand until the zinc salt is wholly precipitated. The liquid is then drawn off into crystallizing pans and crystallized chlorid of magnesium containing six equivalents of water is obtained therefrom. This crystallization ordinarily lasts several days, according to the season, and the crystals thus formed after drying are heated to drive off hydrochloric acid, the gas being dissolved in water in the well known manner. After driving off the hydrochloric acid magnesia is left as a residue. It will thus be noted that the magnesia from which carbonate of magnesium employed in the process is obtained, and the lime and hydrochloric acid from which chlorid of calcium employed in the process are obtained, are by-products in the actual carrying out of the process, so that the employment of these ingredients insures the economy and the industrial success of the process.

The purified carbonate of zinc produced in the manner described is dried and heated to drive off the carbon dioxid contained therein. The carbon dioxid evolved is conducted into the milk of magnesia, forming carbonate of magnesia, which I use to form carbonate of zinc in my process. After heating the hydrocarbonate of zinc I obtain zinc oxid, the operation from beginning to end ordinarily lasting about ten hours.

In producing a quintal (fifty kilograms) of oxid of zinc, I employ the quantities of ingredients hereinafter indicated. Fifty kilograms of anhydrous zinc oxid contain forty kilograms of zinc. If the ore runs eighteen per cent zinc oxid the quantity of ore required is indicated by the following proportion to be 222 kilograms.

$$18 : 100 :: 40 : x$$
$$x = 222 \text{ kilograms of ore.}$$

To ascertain the quantity of chlorid of calcium necessary to decompose the oxid of zinc existing in 222 kilograms of mineral, I employ the following proportion:

$$40.53 : 55.53 :: 50 : x$$
$$x = 68.50 \text{ kilograms of chlorid of calcium.}$$

To find the quantity of hydrochloric acid and lime necessary to produce the chlorid of calcium mentioned, I employ the following proportion:

$$55.53 : 36.53 :: 68.50 : x$$
$$x = 45 \text{ kilograms of hydrochloric acid,}$$

and $$55.53 : 28 :: 68.58 : x$$
$$x = 34.80 \text{ kilograms of lime.}$$

To determine the amount of magnesia required in producing fifty kilograms of zinc oxid, I employ the following proportion:

$$40.53 : 20 :: 50 : x$$
$$x = 24.60 \text{ kilograms of magnesia.}$$

The amounts of the ingredients above mentioned are those which it is necessary to employ in my process. From the reactions given the quantity of reagents necessary to treat ore of a different degree of purity may be readily determined.

Having thus described my invention, what I claim is:

A process of producing zinc oxid from zinc ore containing carbonate of zinc, which consists in reducing said carbonate to oxid of zinc by calcination, heating the zinc oxid with chlorid of calcium to produce zinc chlorid, removing zinc chlorid in solution from the remaining portions of the ore, transforming the zinc chlorid into a carbonate of zinc by the action of carbonate of magnesium, and finally transforming the resulting carbonate of zinc into zinc oxid by the aid of heat, substantially as described.

In testimony whereof I affix my signature in presence of two witnesses.

FRANCISCO SOTO MOYANO.

Witnesses:
MADDIN SUMMERS,
EDWARDO MORALESDIA.